9119X
H. Holt,
Clover Huller.
Patented Sept. 26, 1835
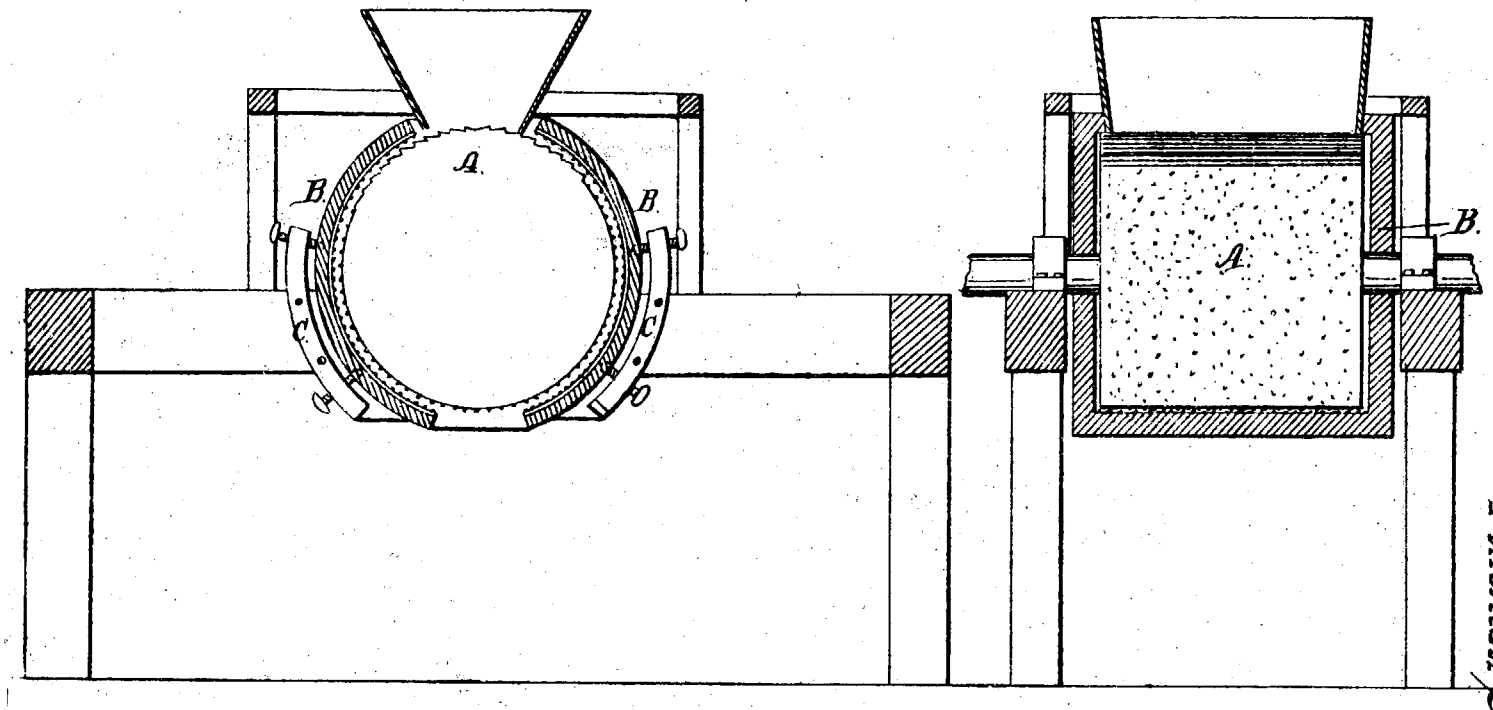
THE ECKERT LITHOGRAPHING CO., WASHINGTON, D. C.

9119X Sept 26. 1835

Hiram Holt, of Weld in the County of Oxford, Maine

Letters Patent

The schedule referred to in these Letters Patent and making part of the same, containing a description in the words of the said Hiram Holt himself of his improvement in a machine for getting out clover seed and other grass seeds and small grain To all whom these presents shall come Be it known that I, Hiram Holt of Weld in the County of Oxford and State of Maine, have invented a new and useful improvement in a Machine for getting out clover, Seeds, and other grass seeds and small grain, and the following is a full and exact description thereof, Said Machine consists of a cylinder two feet long by two feet in diameter the size and proportion being varied and made larger or smaller according to the power to be applied, said cylinder rests horizontally and on gudgeons in the centre of each end, The circumference or convexity of said cylinder is covered with sheet iron pierced in the manner of a grater excepting a portion of the same on the upper side which is so constructed as to present a ragged jetting or clapboard like projecting surface faced in such manner as to gather in the material for grinding, – The motion of said cylinder in operation will describe part of a circle backwards and forwards, On the outside and facing the convexity of said cylinder (excepting a space left open at the top) over the above named ragged surface for feeding and another space left open underneath as an outlet for the seed both being the length of the cylinder.) is an investment or shell, adapted to the convexity said cylinder, and covered, on the inner or concave side with sheet iron pierced after the manner of a grater and having a gauge attached in order to move the said investment nearer to, or further from said cylinder as occasion may require, And the said Holt says, What I claim as new and as my discoveries and improvement

568.

9119X is the whole cylinder its moving backward and forward making a part
of a revolution each way, acting and being acted upon by the investments
on each side thereby making a double grinding surface, that is a
grinding surface on each side of the cylinder; I do not claim the
motion back and forth in particular, otherwise that as it causes the
cylinder to operate alternately on each side. I do claim an invest-
ment facing the cylinder on each side and I claim the whole cy=
linder as applied to the said investments.

As witness my hand at Weld, County of Oxford &
State of Maine this 23.d of April A.D. 1835.

Witnesses
Lafayette Perkins
John M. Perkins

Hiram Holt

480 [illegible]

[illegible]